United States Patent
Behr et al.

(10) Patent No.: US 6,631,076 B2
(45) Date of Patent: *Oct. 7, 2003

(54) SWITCH CABINET

(75) Inventors: Thorsten Behr, Horn-Bad Meinberg (DE); Roland Berg, Lemgo (DE); Achim Fürhoff, Kirchlengern (DE); Christoph Leifer, Bad Driburg (DE); Heinz Reibke, Bad Salzuflen (DE); Markus Rohs, Schieder-Schwalenberg (DE); Jürgen Weczerek, Blomberg (DE)

(73) Assignee: Phoenix Contact GmbH & Co., Blomberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,681

(22) PCT Filed: Oct. 6, 1998

(86) PCT No.: PCT/EP98/06328

§ 371 (c)(1),
(2), (4) Date: Aug. 25, 1999

(87) PCT Pub. No.: WO99/18634

PCT Pub. Date: Apr. 15, 1999

(65) Prior Publication Data

US 2002/0089815 A1 Jul. 11, 2002

(30) Foreign Application Priority Data

Oct. 6, 1997 (DE) .......................... 197 43 974

(51) Int. Cl.⁷ ................................ H02B 1/20
(52) U.S. Cl. .................. 361/641; 361/809; 439/716
(58) Field of Search ............ 200/307; 248/27.1; 307/147, 148; 361/601, 605, 611, 614, 615, 622, 624, 641, 643, 644, 648, 825, 673, 652–657, 735, 729, 730, 732, 807, 809, 810; 439/110, 212, 532, 716, 839

(56) References Cited

U.S. PATENT DOCUMENTS

| | | | | |
|---|---|---|---|---|
| 3,005,131 A | * | 10/1961 | Melcher et al. | |
| 3,333,158 A | * | 7/1967 | Speck | |
| 3,510,729 A | * | 5/1970 | Gryctko et al. | |
| 3,594,689 A | * | 7/1971 | Hopt et al. | 439/292 |
| 4,401,351 A | * | 8/1983 | Record | 439/61 |
| 4,642,733 A | * | 2/1987 | Schacht | 361/656 |
| 4,918,691 A | * | 4/1990 | Chall, Jr. | 714/30 |
| 4,956,747 A | * | 9/1990 | Beer et al. | 361/728 |
| 5,249,979 A | * | 10/1993 | Deinhardt et al. | 439/341 |
| 5,297,002 A | * | 3/1994 | Flohr | 361/652 |
| 5,493,194 A | * | 2/1996 | Damiano et al. | 318/575 |
| 5,745,338 A | * | 4/1998 | Bartolo et al. | 361/637 |
| 5,803,772 A | * | 9/1998 | Muller et al. | 439/716 |
| 5,905,631 A | * | 5/1999 | Winkler | 361/641 |
| 5,907,476 A | * | 5/1999 | Davidsz | 361/732 |
| 6,097,303 A | * | 8/2000 | Lunz et al. | 340/825 |
| 6,324,063 B1 | * | 11/2001 | Mohler | 361/728 |

FOREIGN PATENT DOCUMENTS

| | | |
|---|---|---|
| DE | 002923925 A * | 12/1980 |
| DE | 37 17 691 A1 | 12/1988 |
| DE | 92 13 496.3 | 1/1993 |
| DE | 195 11 349 C1 | 9/1996 |
| EP | 0 112 232 A1 | 6/1984 |
| WO | WO 94/18816 | 8/1994 |
| WO | WO 97/10692 | 3/1997 |

* cited by examiner

Primary Examiner—Gerald Tolin
(74) Attorney, Agent, or Firm—Nixon Peabody LLP; David S. Safran

(57) ABSTRACT

A switch cabinet (1) comprises a case (2), several modules (3) and a supporting rail (4), the modules (3) being secured on the supporting rail (4). The disclosed switch cabinet (1) is characterised in that it is designed in functional blocks and modules, so that all modules (3) required by a machine and only those modules are mounted in the switch cabinet case (2).

10 Claims, 5 Drawing Sheets

SWITCH CABINET

Figure 1:
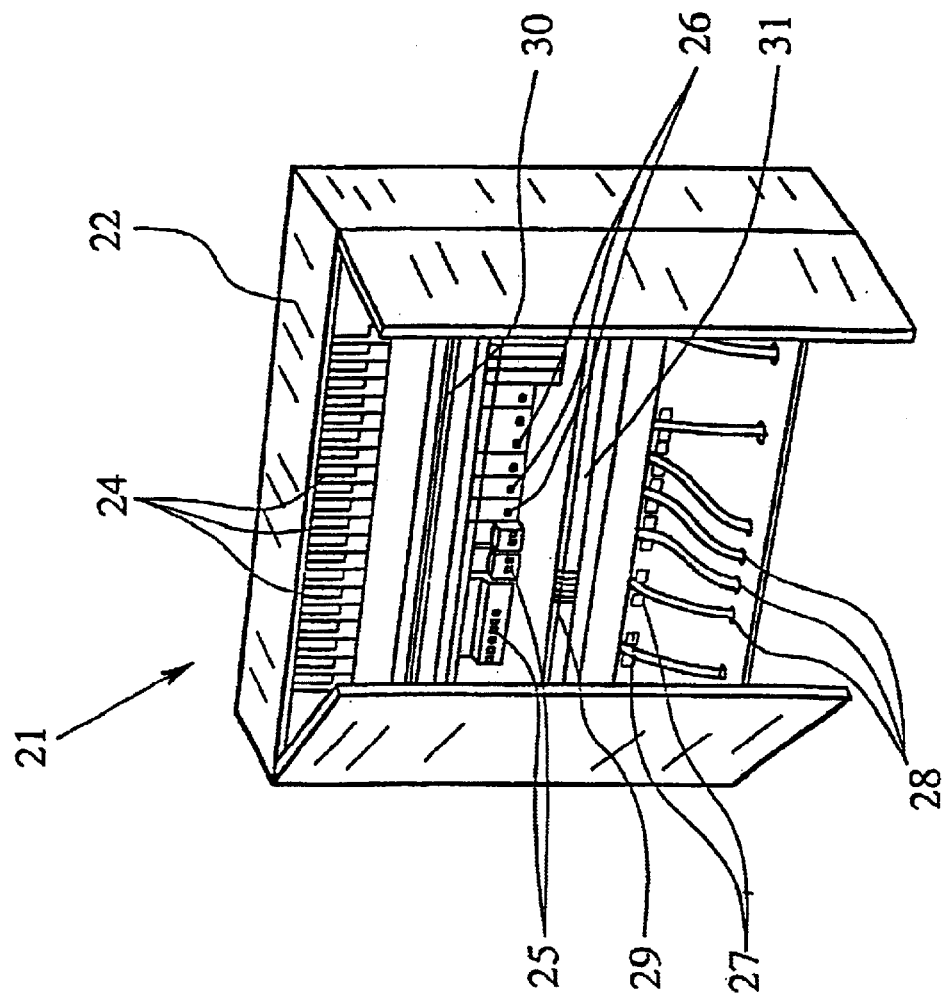

The invention relates to a switchgear cabinet with a switchgear box, with several modules and with a mounting rail, the modules being attached on the mounting rail.

In factories and in shop and assembly sheds there are large-area, module-oriented switchgear cabinets, usually in large numbers and at stipulated locations. In these, often closet-sized switchgear cabinets there are a host of electrical and electronic components and devices which are necessary to supply and control the various machines which are dispersed in the shop. Typically the electrical and electronic units and devices which are located in these switchgear cabinets include power switches, power packs, input/output modules, fuses, transformers and terminals for access wiring and for intermediate and outgoing routing. The individual electrical or electronic components and devices are arranged in a module-oriented manner in the switchgear cabinet, i.e in one area of the switchgear cabinet there are for example several input/output modules, in another area, all the power switches.

Classical switchgear cabinets of the aforementioned type have several disadvantages. First of all, due to their size they require a large amount of space. Because of the module-oriented structure of the switchgear cabinet, expansion of the latter which is necessary due to modification of an individual machine is very complex. This requires careful and complex individual design of each individual switchgear cabinet, the demand for units and devices of current and future machines having to be considered. To enable later modification of a machine at all, therefore frequently a larger number of units and devices is installed as a back-up in the switchgear cabinet. On the one hand, this causes additional costs due to the back-up units and devices, on the other the amount of space required is further increased thereby. The complex cross wiring of the individual units and devices via terminal blocks which are used as intermediate wiring blocks is especially disadvantageous. This cross wiring is on the one hand very time consuming, on the other it can only be done by personnel with a high level of specialization and then is still highly subject to error. Once a fault occurs, on the one hand troubleshooting is very difficult and thus time-consuming, on the other it can be necessary to turn off most of the machines for a longer time under certain circumstances.

In recent years a reduction in the cost of classical individual wiring of these units or devices has begun due to the use of bus systems in the connection of sensors, actuators, and also various input-output modules. Thus the object of this invention is to use the advantages which this bus system offers in data and power transmission for a new generation of switchgear cabinets as well. Here the above described disadvantages of the classical switchgear cabinets will be avoided.

The aforementioned object is first of all essentially achieved by the switchgear cabinet being function block-oriented and modular, specifically all modules necessary for a machine and only they are installed. The switchgear cabinet as claimed in the invention thus contains only the number of modules which is necessary for its dedicated function. Due to the modular structure of the switchgear cabinet optimum matching to the requirements of each individual machine is possible. Otherwise the amount of space necessary is much less and standardized switchgear cabinet boxes can be used.

For the purposes of the invention modules are defined as all electrical or electronic units and devices which are typically located in a classical switchgear cabinet, for example power packs, power switches, input/output modules, fuses and transformers. The modules do not differ in their technical function from the electrical and electronic units and devices of a classical switchgear cabinet, but only in their simpler manner of installation and removal.

According to one especially advantageous embodiment of the invention the individual modules are mounted in the switchgear cabinet and connected among one another such that they can be interchanged without tools. In doing so electrical connection of the individual modules among one another by means of contact swords takes place so that cross wiring is unnecessary. Because it is possible to replace each individual module regardless of its position in the switchgear cabinet or to add new modules, it is no longer necessary to make available back-up modules so that the material cost can be greatly reduced.

According to one especially advantageous embodiment of the invention the individual modules are mounted in the switchgear cabinet and connected among one another such that they can be interchanged without tools. In doing so electrical connection of the individual modules among one another by means of contact blades takes place so that cross wiring is unnecessary. Because it is possible to replace each individual module regardless of its position in the switchgear cabinet or to add new modules, it is no longer necessary to make available back-up modules so that the material cost can be greatly reduced.

Advantageously the switchgear cabinet as claimed in the invention has internal potential and data routing with a universal busbar. For this reason the individual modules are also supplied with the necessary electrical power when an individual module is defective or is being replaced.

In particular there are a host of possibilities for embodying and developing the switchgear cabinet as claimed in the invention. In this respect reference is made on the one hand to the claims subordinate to claim 1, on the other hand to the description of preferred embodiments in conjunction with the drawings.

Figure 2:
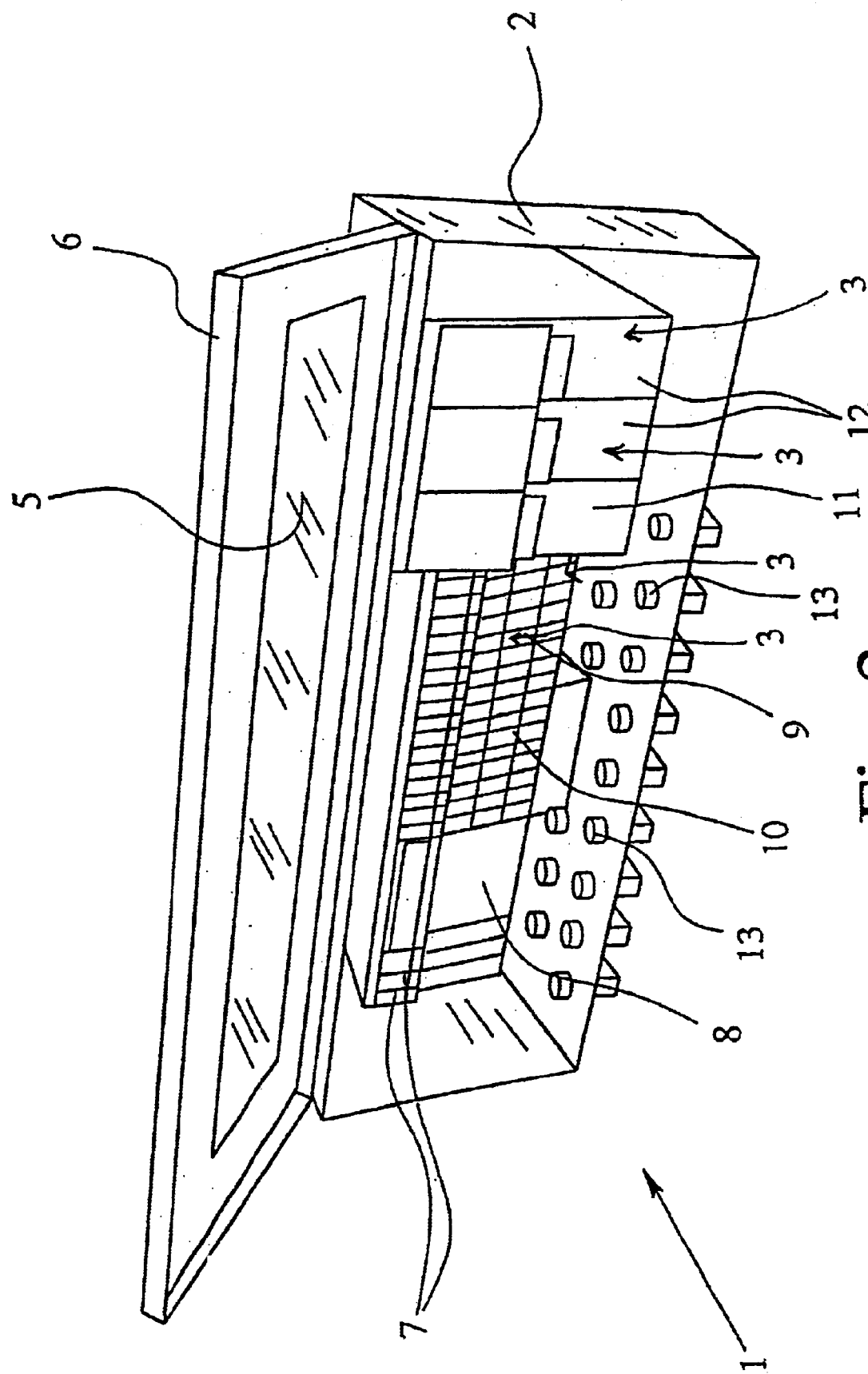
Figure 3:
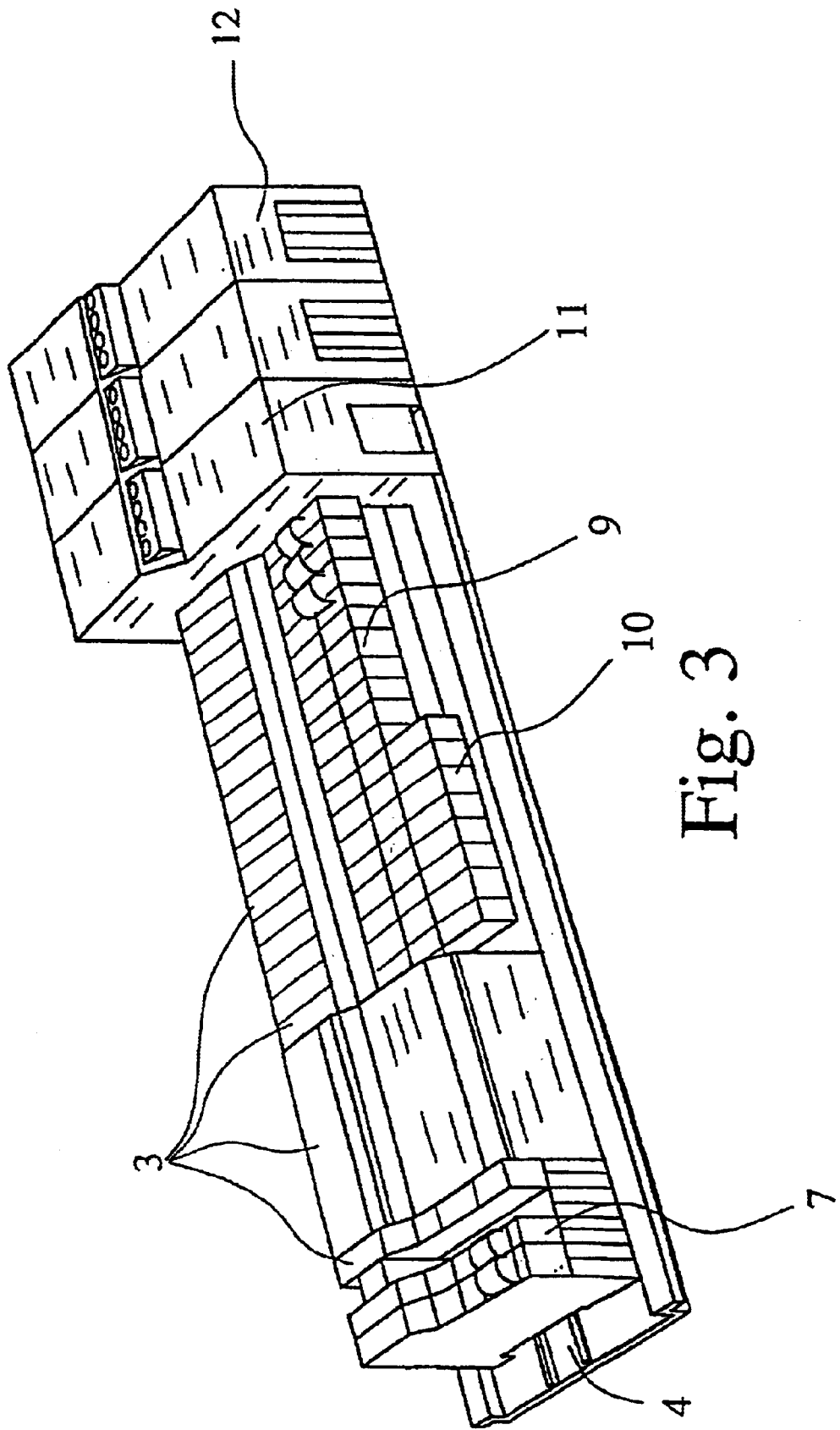
Figure 4:
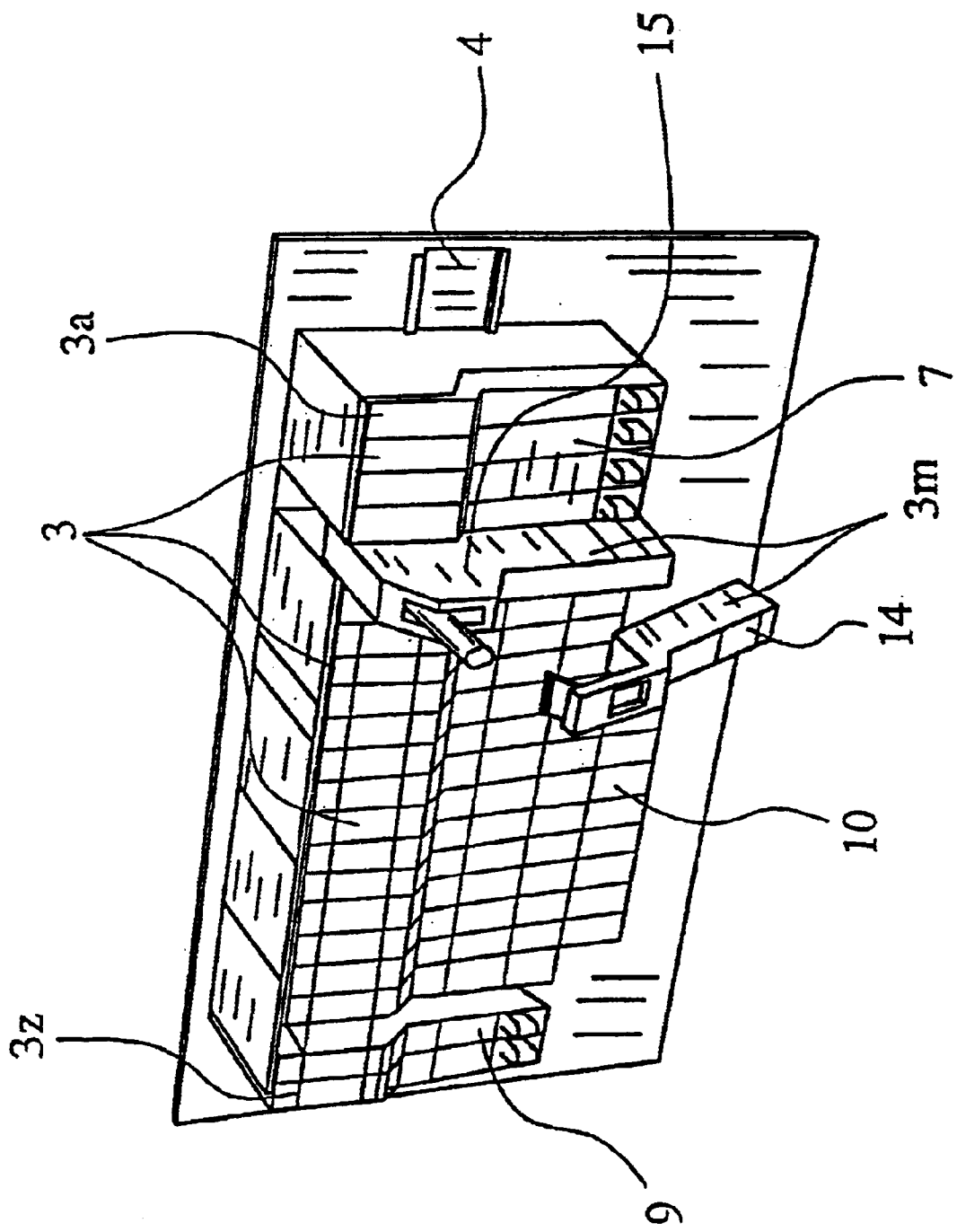
Figure 5:
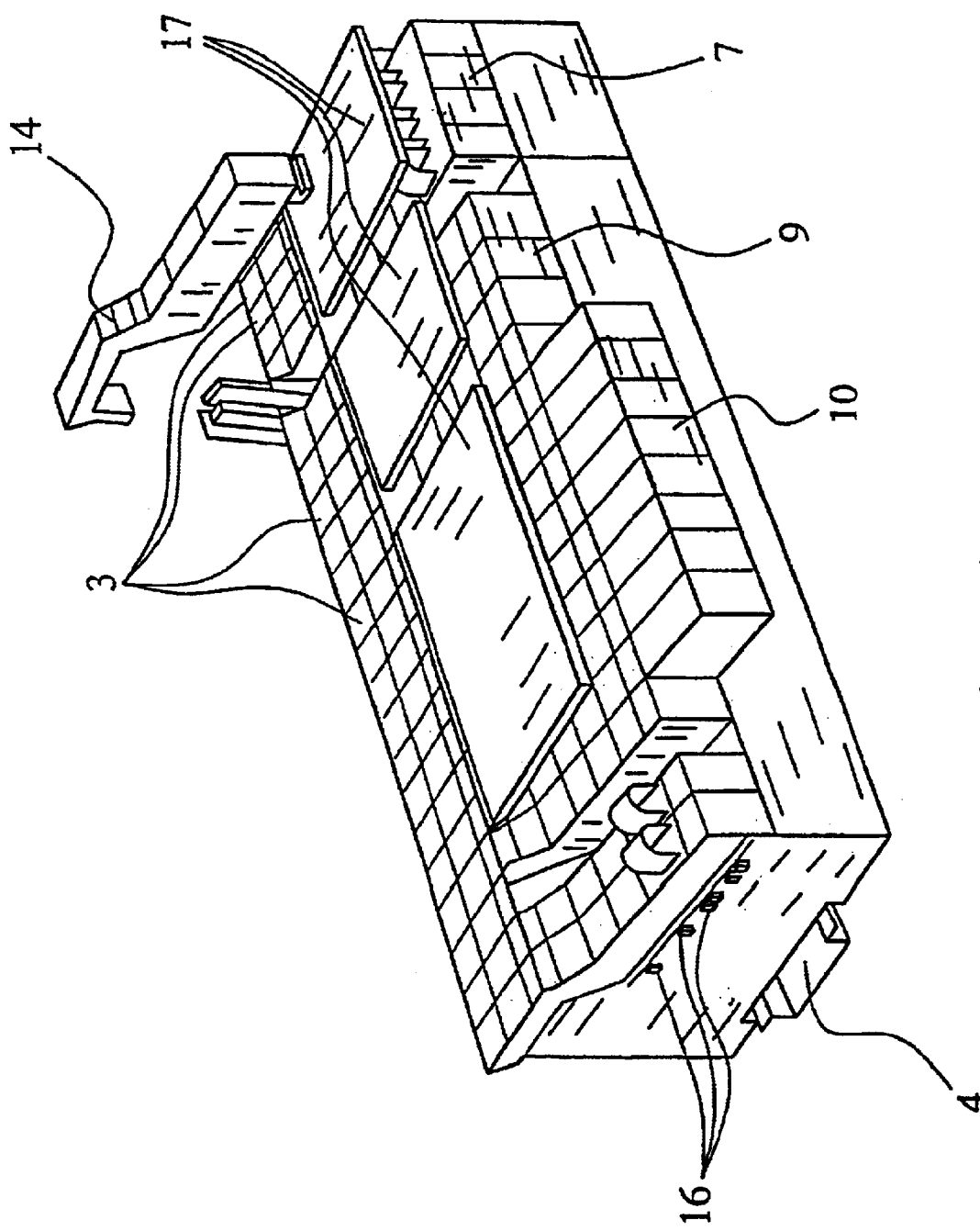

FIG. 1 shows one embodiment of a classical module-oriented switchgear cabinet,

FIG. 2 shows one embodiment of a function block-oriented and modular switchgear cabinet as claimed in the invention, FIG. 3 shows the switchgear cabinet from FIG. 2, but without the switchgear cabinet boxes, FIG. 4 shows a second embodiment of a switchgear cabinet as claimed in the invention, likewise without the switchgear cabinet boxes, and FIG. 5 shows another embodiment of a switchgear cabinet as claimed in the invention, likewise without the switchgear cabinet boxes.

FIG. 1 shows a classical module-oriented switchgear cabinet 21 with one switchgear cabinet box 22 and several electrical and electronic units and devices. In the upper area of the switchgear cabinet 21 there are several input/output modules 24, in the middle area on the one hand several fuse elements 25, on the other hand a larger number of power switches 26, and in the lower area devices 27 for attachment of cable bundles 28 which lead to the individual machines. To connect the individual units and devices among one another, in the switchgear cabinet 21 there are several terminals 29 for access wiring, several terminals 30 for intermediate routing, and several terminals 31 for outgoing routing.

The switchgear cabinet 21 shown in FIG. 1 is used to supply several machines so that it requires a relatively large amount of space. Due to the extensive cross wiring between the units and devices and the terminals 29, 30 and 31, expansion of the switchgear cabinet 21 with additional units and devices or replacement of faulty units and devices is associated with a very high cost. For this reason, in the planning of this switchgear cabinet 21 not only the current demand for units and devices of the machines must be considered, but also replacement units and devices as well as supplementary units and devices must also be installed in the switchgear cabinet 21.

Conversely, FIG. 2 shows a switchgear cabinet 1 as claimed in the invention, with a switchgear cabinet box 2 and modules 3 located therein which are mounted on a common mounting rail 4 which is not visible here. The individual modules 3 are visible from the outside behind the pane 5 of a folding cover 6, and, as is shown in FIG. 2, they are accessible from the front with the cover 6 folded up. The switchgear cabinet 1 is function block-oriented, i.e. it contains only the modules 3 which are necessary for operation of one machine.

The switchgear cabinet 1, as is shown in FIG. 2, contains several bus terminals 7 for connection of the switchgear cabinet 1 to a bus system, a signal monitoring unit 8, several input/output modules 9, 10, a power pack 11, and two load relays 12. The input/output modules 9 differ from input/output modules 10 solely by a smaller number of connection channels. In the bottom of the switchgear cabinet box 2 are cable penetrations 13 through which the lines of the machine which belongs to the switchgear cabinet 1 and lines for additional sensor or actuators can extend into the interior of the switchgear cabinet 1. The cable penetrations 13 are used at the same time however also for strain relief of the connected lines. Overall the switchgear cabinet 1 and especially the switchgear cabinet box 2 are made such that the switchgear cabinet 1 corresponds at least to safety class IP 65.

FIG. 3 shows the same switchgear cabinet 1 as FIG. 2, but without the switchgear cabinet box 2. Another embodiment of a switchgear cabinet 1 as claimed in the invention is shown in FIG. 4, also here without the switchgear cabinet box 2. FIGS. 3 and 4 show that the individual modules 3, which, as represented, can be of different sizes, are mounted on a common mounting rail 4 which is made hat-shaped; preferably they are simply latched on this mounting rail 4 such that individual modules 3m, as shown in FIG. 4, can be replaced without a tool. Here it is especially advantageous that the individual modules 3 are made such that not only one edge module 3a or 3z, but any module 3m can be replaced. This is enabled by the fact that the modules 3 can be latched onto the mounting rail 4 from overhead, therefore cannot be pushed on solely from one side.

Otherwise both the bus terminals 7 and also the input/output modules 9 and 10 are characterized in that both the entire module 3 and also simply one top part 14 of the module can be removed. In the bus terminals 7 and the input/output modules 9, 10 the top part 14 of the module is thus used as a plug-in module. Because the bus terminals 7 and the input/output modules are made in two parts, it is possible to replace a faulty bus terminal 7 or a defective input/output module 9 or 10 without the need to remove the wiring. The top part 14 of the module need simply be removed of the bottom part of the module 15 and then the defective bottom part 15 of the module is replaced as the wiring remains stationary. Then the top part 14 of the module is seated again on the new bottom part 15 of the module. For example the top part 14 of the module can be removed of the bottom part by releasing a catch connection.

FIG. 5 shows another embodiment of a switchgear cabinet 1 as claimed in the invention. Here again the interchangeability of the modules 3 or the top parts 14 of the module is shown. In addition, FIG. 5 shows the contact blades 16 which are located in the modules 3. The contact blades 16 establish the electrical connection of the individual modules 3 among one another. In the switchgear cabinet 1 as is shown in FIG. 5, individual modules 3 have fields 17 for lettering and signal identification of the modules 3. During contacting of the modules 3 or wiring of the top parts 14 of the modules these fields 17 can be either entirely released therefrom or they can be swivelled out of their display position shown in FIG. 5, so that free access to the modules 3 or the contacts of the top parts 14 of the modules is possible. For this reason fields 17 with one of their two short sides are supported in the corresponding recesses of the modules 3 to be able to swivel and to be released.

Overall, due to the different exemplary embodiments of the switchgear cabinet 1 as claimed in the invention it becomes clear that due to the modular structure and the simple replacement of individual modules 3 without tools simple adaptation of each individual switchgear cabinet 1 to any given situation is possible. Matching of the individual switchgear cabinets 1 to a respective machine moreover makes it possible to execute partial start-up in a system composed of several machines or to perform preliminary tests of the individual machines before the entire system is started up. In this way the structure and the connection of an extensive system becomes more reliable, simpler, and faster.

What is claimed is:

1. A switchgear cabinet for hosting electrical and electronic components and devices for each of a plurality of different machines each having different electronic requirements comprising:

a switchgear box, a plurality of modules at least some of which are of different types and sizes relative to other modules wherein each individual module within the switchgear cabinet is matched to the electronic requirements of one of the plurality of different machines, and a mounting rail mounted in the cabinet, wherein some of the plurality of different types and sizes of modules are attached on the mounting rail, and various combinations of different types and sizes of modules are attachable on the mounting rail in accordance with the electronic requirements of the plurality of different machines, and wherein each of said plurality of modules comprises at least one contact blade for interconnection of the modules to each other without cross wiring.

2. The switchgear cabinet as claimed in claim 1, wherein the mounting rail is a hat-shaped rail onto which the plurality of modules are latched to the rail in a manner obviating the need for the use of tools in a module replacement.

3. The switchgear cabinet as claimed in claim 2, wherein the mounting rail allows mounting of modules or adding new modules in any position on the mounting rail.

4. The switchgear cabinet as claimed in claim 1, further comprising a bus mounted in the cabinet that allows interconnection of the modules in the switchgear cabinet to other switchgear cabinets, to various other machines, and to a central power supply and/or a control unit.

5. The switchgear cabinet as claimed in claim 1, further comprising a bus mounted in the cabinet for internally carrying power and routing data.

6. The switchgear cabinet as claimed in claim 1, wherein each of the plurality of modules has movable fields for lettering and signal identification.

7. The switchgear cabinet as claimed in claim 1, wherein the at least one contact blade and the mounting rail facilitate the replacement of the modules by obviating the need for the use of tools during the replacement thereof.

8. The switchgear cabinet as claimed in claim 3, further comprising a bus system mounted in the cabinet that allows interconnection of the modules in the switchgear cabinet to other switchgear cabinets, to various other machines, and to a central power supply and/or a control unit.

9. The switchgear cabinet as claimed in claim 4, wherein the bus further allows internal potential and data routing.

10. The switchgear cabinet as claimed in claim 4, wherein each of the plurality of modules has movable fields for lettering and signal identification.

* * * * *